(12) United States Patent
Chou et al.

(10) Patent No.: US 10,455,217 B2
(45) Date of Patent: Oct. 22, 2019

(54) ELECTRONIC APPARATUS AND METHOD OF GENERATING DEPTH MAP

(71) Applicant: Altek Semiconductor Corp., Hsinchu (TW)

(72) Inventors: Hong-Long Chou, Hsinchu (TW); Shou-Te Wei, Hsinchu (TW); Yuan-Lin Liao, Hsinchu (TW); Yu-Chih Wang, Hsinchu (TW); Kai-Yu Tseng, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 406 days.

(21) Appl. No.: 15/286,580

(22) Filed: Oct. 6, 2016

(65) Prior Publication Data

US 2017/0264884 A1 Sep. 14, 2017

Related U.S. Application Data

(60) Provisional application No. 62/304,952, filed on Mar. 8, 2016.

(30) Foreign Application Priority Data

Aug. 24, 2016 (TW) .............................. 105126999 A

(51) Int. Cl.
*H04N 5/33* (2006.01)
*H04N 13/243* (2018.01)
(Continued)

(52) U.S. Cl.
CPC ........... *H04N 13/243* (2018.05); *G06T 7/521* (2017.01); *G06T 7/55* (2017.01); *H04N 5/2226* (2013.01);
(Continued)

(58) Field of Classification Search
CPC .... H04N 13/25; H04N 13/271; H04N 5/2258; H04N 2013/0081; H04N 5/332;
(Continued)

(56) References Cited

U.S. PATENT DOCUMENTS 9,674,504 B1* 6/2017 Salvagnini .............. G01S 17/89
2014/0104391 A1 4/2014 Kim et al.

FOREIGN PATENT DOCUMENTS

CN 104604220 5/2015
CN 104918035 9/2015

OTHER PUBLICATIONS

"Office Action of China Counterpart Application," dated Jun. 14, 2018, pp. 1-8.

* cited by examiner

*Primary Examiner* — Obafemi O Sosanya
(74) *Attorney, Agent, or Firm* — JCIPRNET

(57) ABSTRACT

An electronic apparatus and a method of generating a depth map are provided. The electronic apparatus includes a projection device, a first camera, a second camera, and a processing device. The projection device projects patterned invisible light on a scene. The first camera captures visible light information to generate a first image. The second camera captures visible light information and invisible light information to generate a second image. The processing device receives the first image and the second image. A first depth information unit in the processing device compares visible light images of the first image and the second image to obtain first depth information, and a second depth information unit in the processing device identifies an invisible light image in the second image to obtain second depth information. The processing device generates a depth map of
(Continued)

the scene from the first depth information and the second depth information selectively.

18 Claims, 6 Drawing Sheets

(51) Int. Cl.
    *H04N 13/128*     (2018.01)
    *G06T 7/521*     (2017.01)
    *G06T 7/55*     (2017.01)
    *H04N 5/222*     (2006.01)
    *H04N 5/225*     (2006.01)

(52) U.S. Cl.
    CPC .......... *H04N 5/2258* (2013.01); *H04N 13/128* (2018.05); *G06T 2207/10012* (2013.01); *G06T 2207/10016* (2013.01); *G06T 2207/10024* (2013.01); *G06T 2207/10048* (2013.01); *G06T 2207/30168* (2013.01); *H04N 5/33* (2013.01)

(58) Field of Classification Search
    CPC ........... G01S 17/89; G06T 2207/10012; G06T 2207/10016; G06T 2207/10024; G06T 2207/10048; G06T 2207/30168; G06T 7/521; G06T 7/55
    See application file for complete search history.

ELECTRONIC APPARATUS AND METHOD OF GENERATING DEPTH MAP

CROSS-REFERENCE TO RELATED APPLICATION

This application claims the priority benefit of U.S. provisional application Ser. No. 62/304,952, filed on Mar. 8, 2016 and Taiwan application serial no. 105126999, filed on Aug. 24, 2016. The entirety of each of the above-mentioned patent application is hereby incorporated by reference herein and made a part of this specification.

BACKGROUND OF THE INVENTION

Field of the Invention

The invention relates to an electronic apparatus and a method used in image processing, and particularly relates to an electronic apparatus and a method of generating a depth map.

Description of Related Art

With the development of science and technology, a variety of intelligent electronic apparatuses, such as a tablet computer, a personal digital assistant, a smart phone, a smart camera, have had the function of shooting a three-dimensional image. Furthermore, with different back-end calculation function, the three-dimensional image can also be used in three-dimensional modeling, action identification, and other purposes.

When using the aforementioned intelligent electronic apparatuses for shooting the three-dimensional image in a specific scene, depth information of the scene is an important basis of showing a three-dimensional visual effect. In general, from the corresponding depth map, a processing element can determine a relative distance of a plurality of objects or features in the scene, thereby showing the three-dimensional image related to the scene precisely.

However, obtaining the depth map of the shooting scene is still difficult. In particular, limited to the environment, the distance, and other factors of the shooting scene, depth information calculated from the captured image is not always correct. Thus, how to obtain the depth information and the depth map of the shooting scene effectively and preferably is still one of the goals for those skilled in the art to work on.

SUMMARY OF THE INVENTION

The invention provides an electronic apparatus and a method of generating a depth map, which can adapt to different shooting scenes so as to obtain depth information and a depth map of the scene accurately and effectively.

An embodiment of the invention provides an electronic apparatus of generating a depth map. The electronic apparatus includes a projection device, a first camera, a second camera, and a processing device. The projection device projects patterned invisible light on a scene. The first camera captures visible light information to generate a first image of the aforementioned scene. The second camera captures visible light information and invisible light information to generate a second image of the aforementioned scene. The processing device is coupled to the projection device, the first camera and the second camera to receive the first image and the second image. The processing device obtains first depth information and second depth information from the first image and the second image, and generates a depth map of the aforementioned scene from the first depth information and the second depth information selectively. More specifically, the processing device includes a first depth information unit and a second depth information unit. The first depth information unit compares a visible light image of the first image with a visible light image of the second image to obtain the first depth information. The second depth information unit identifies an invisible light image in the second image to obtain the second depth information.

An embodiment of the invention also provides a method of generating a depth map suitable for an electronic apparatus with a first camera and a second camera. The aforementioned method includes the following steps. Patterned invisible light is projected on a scene. A first image of the aforementioned scene is captured, wherein the first image includes visible light information. A second image of the aforementioned scene is captured, wherein the second image includes visible light information and invisible light information, and the invisible light information includes image signals generated from reflecting the patterned invisible light by the aforementioned scene. First depth information and second depth information are obtained from the first image and the second image. More specifically, the step of obtaining the first depth information and the second depth information includes the steps as follows. A visible light image of the first image is compared with a visible light image of the second image to obtain the first depth information. An invisible light image in the second image is identified to obtain the second depth information. A depth map of the aforementioned scene is generated from the first depth information and the second depth information selectively.

An embodiment of the invention also provides another electronic apparatus of generating a depth map. The electronic apparatus includes a projection device, a first camera, a second camera and a processing device. The projection device projects patterned infrared light on a scene. The first camera captures red-green-blue (RGB) light information to generate a first image of the aforementioned scene. The second camera captures RGB light information and infrared light information to generate a second image of the aforementioned scene. The processing device is coupled to the projection device, the first camera and the second camera to receive the first image and the second image. The processing device obtains first depth information and second depth information from the first image and the second image, and generates a depth map of the aforementioned scene from the first depth information and the second depth information selectively. More specifically, the processing device includes a first depth information unit and a second depth information unit. The first depth information unit compares an RGB image of the first image with an RGB image of the second image to obtain the first depth information. The second depth information unit identifies an infrared light image in the second image to obtain the second depth information.

An embodiment of the invention provides a further electronic apparatus of generating a depth map. The electronic apparatus includes a projection device, a first camera, a second camera, a third camera and a processing device. The projection device projects patterned infrared light on a scene. The first camera captures RGB light information to generate a first image of the aforementioned scene. The second camera captures RGB light information to generate a second image of the aforementioned scene. The third camera captures infrared light information to generate a third image of the aforementioned scene. The processing device is coupled to the projection device, the first camera, the second camera and the third camera to receive the first image, the second image and the third image. The processing device obtains first depth information and second depth information from the first image, the second image and the third image, and generates a depth map of the aforementioned scene from the first depth information and the second depth information selectively. More specifically, the processing device includes a first depth information unit and a second depth information unit. The first depth information unit compares the first image with the second image to obtain the first depth information. The second depth information unit identifies the third image to obtain the second depth information.

Based on the above, in the electronic apparatus and the method of generating the depth map provided by the embodiments of the invention, the patterned invisible light is projected on the shooting scene first. Then, a pair of the first camera and the second camera is used to obtain the first image and the second image of the shooting scene respectively. The first depth information and the second depth information are obtained respectively through the visible light images and the invisible light image in the first image and the second image, and then the depth map of the aforementioned shooting scene is generated according to the first depth information and the second depth information selectively. As the result, the error generated from single depth information affected by the influence of external environmental factors or different shooting scene can be avoided, which may further affect accuracy of the depth map of the aforementioned scene. On the other hand, the number and the setting format of the camera can be adjusted correspondingly, which are not limited to the aforementioned pair of the first camera and the second camera.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
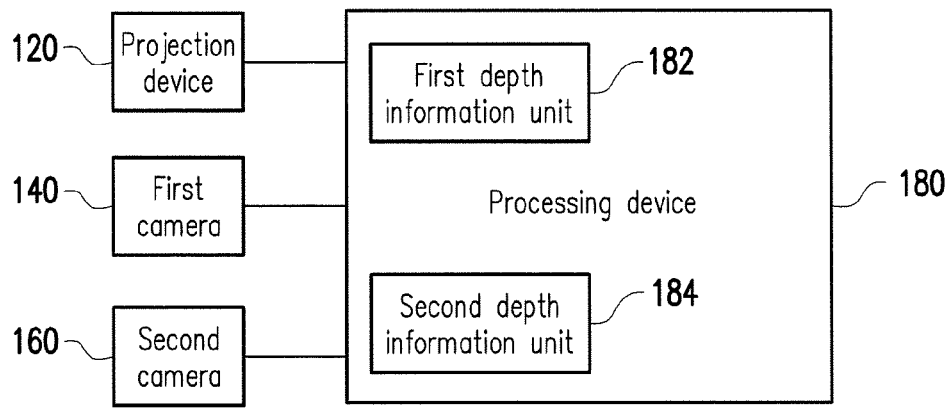
FIG. 1 is a schematic block diagram illustrating an electronic apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

In the electronic apparatus and the method thereof provided by the embodiments of the invention, multiple sets of depth information of the same scene are respectively obtained through different ways, and the sets of depth information are evaluated according to environmental conditions or other factors of the aforementioned scene, thereby obtaining the depth map of the aforementioned scene accurately.

FIG. 1 is a schematic block diagram illustrating an electronic apparatus according to an embodiment of the invention. Referring to FIG. 1, in the embodiment, an electronic apparatus 100 of generating the depth map includes a projection device 120, a first camera 140, a second camera 160, and a processing device 180. The electronic apparatus 100 may be a digital camera, a single lens reflex camera, a digital camcorder, or a smart mobile phone, a tablet computer, a personal digital assistant, a notebook, and other electronic apparatuses with an image capture function, for example. However, the invention is not limited thereto.

In the embodiment, the projection device 120 may project patterned invisible light. In other words, the projection device 120 may project a pattern on any scene in the form of invisible light according to a preset pattern. The projection device 120 may be a combination of an invisible light source and a light source mask, a combination of an invisible light source and a diffractive optical element (DOE), or an illuminator which can project invisible light, for example. For instance, the invisible light source is an infrared light source (IR light source), for example, and the projection device 120 is an infrared illuminator (IR illuminator) or a scanning infrared projector (IR projector) accomplished by using a micro-electro-mechanical system (MEMS) resonant lens, for example. However, the invention is not limited thereto.

In the embodiment, the first camera 140 and the second camera 160 include photosensitive elements used to shoot any scene and generate a first image and a second image respectively. The photosensitive element is a charge coupled device (CCD), a complementary metal-oxide semiconductor (CMOS) element, or other elements, for example. More specifically, the photosensitive elements in the first camera 140 and the second camera 160 are arranged in an array and covered by different types of Bayer filters, so as to capture visible light information and/or invisible light information.

For instance, on the array of the photosensitive elements of the first camera 140 is covered by the Bayer filter composed of a red filter, a blue filter and a green filter to capture red-blue-green (RGB) light information, so as to generate the first image, for example. On the array of the photosensitive elements of the second camera 160 is covered by the Bayer filter composed of a red filter, a blue filter, a green filter and an infrared light filter to obtain RGB light information and infrared light information, so as to generate the second image, for example. It should be noted that, the first camera 140 and the second camera 160 of the invention are not limited to the aforementioned design. For instance, the first camera 140 and the second camera 160 include the following possible combinations, such as a combination of a red-green-blue camera (RGB camera) and a red-green-blue infrared light camera (RGB-IR camera), a combination of an RGB camera and a monochromatic light-infrared light camera (MONO-IR camera), and a combination of a monochromatic light camera (MONO camera) and an RGB-IR camera. The first camera 140 and the second camera 160 are one of the aforementioned multiple combinations.

In the embodiment, the processing device 180 may be a central processing unit (CPU), a programmable microprocessor for general purpose or special purpose, a digital signal processor (DSP), a programmable controller, application specific integrated circuits (ASIC), a programmable logic device (PLD), other similar device, or a combination of the above devices. The processing device 180 is coupled to the projection device 120, the first camera 140, and the second camera 160 to receive the first image and the second image. More specifically, the processing device 180 includes a first depth information unit 182 and a second depth information unit 184.

In the embodiment, the electronic apparatus 100 may also include a memory device (not shown), for example. The memory device is coupled to the first camera 140, the second camera 160 and the processing device 180, and used to store the first image and the second image. The memory device may be any type of fixed or movable random access memory (RAM), read-only memory (RAM), flash memory, a hard disk, other similar device, or a combination of the above devices, for example.

Figure 2:
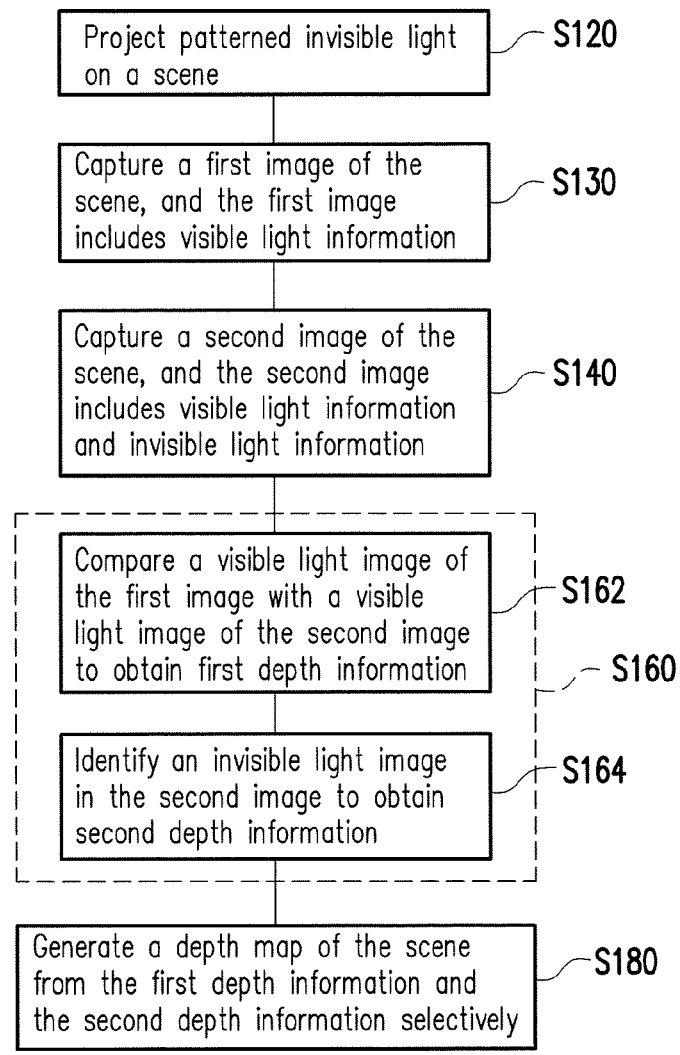
FIG. 2 is a flow chart illustrating a method of generating a depth map according to an embodiment of the invention.

Embodiments are listed below to illustrate detailed steps of generating the depth map by the electronic apparatus 100. FIG. 2 is a flow chart illustrating a method of generating a depth map according to an embodiment of the invention. The method of generating the depth map of the embodiment is suitable for the electronic apparatus 100 as shown in FIG. 1. Referring to FIG. 1 and FIG. 2, the projection device 120 is used to project patterned invisible light on one scene (Step S120).

More particularly, in the embodiment, the projection device 120 may be accomplished by different elements or element combinations, such as a combination of an invisible light source and a diffractive optical element, or a combination of an invisible light source and a light source mask. By the diffractive optical element or the light source mask, the projection device 120 may project the patterned invisible light onto one scene according to one preset pattern. In other words, one pattern composed of invisible light will be projected on the aforementioned scene. It should be noted that, when the invisible light source is the aforementioned IR light source, the projection device 120 may be an IR illuminator or an IR projector, for example, which can project the patterned infrared light on the aforementioned scene according to the preset pattern or user operation.

Referring to FIG. 1 and FIG. 2, then, in the embodiment, the first camera 140 is used to capture the first image of the aforementioned scene (Step S130), and the first image includes visible light information. Also, the second camera 160 is used to capture the second image of the aforementioned scene (Step S140), and the second image includes visible light information and invisible light information. The shooting on the same scene is carried out from different viewing angles by the first camera 140 and the second camera 160 respectively, and the aforementioned scene is the scene where the invisible light projected thereon by the projection device 120. In the embodiment, the first camera 140 captures the visible light information to generate the first image of the aforementioned scene. On the other hand, the second camera 160 not only captures the visible light information, but also captures the invisible light information to generate the second image of the aforementioned scene. The invisible light information includes image signals generated from reflecting the patterned invisible light by the aforementioned scene. In other words, the second camera 160 may further capture the invisible light image reflected on the aforementioned scene from the patterned invisible light projected by the projection device 120.

Referring to FIG. 1 and FIG. 2, after obtaining the first image and the second image, in the embodiment, the processing device 180 obtains first depth information and second depth information from the first image and the second image (Step S160), and then generates a depth map of the aforementioned scene from the first depth information and the second depth information selectively (Step S180).

Figure 3:
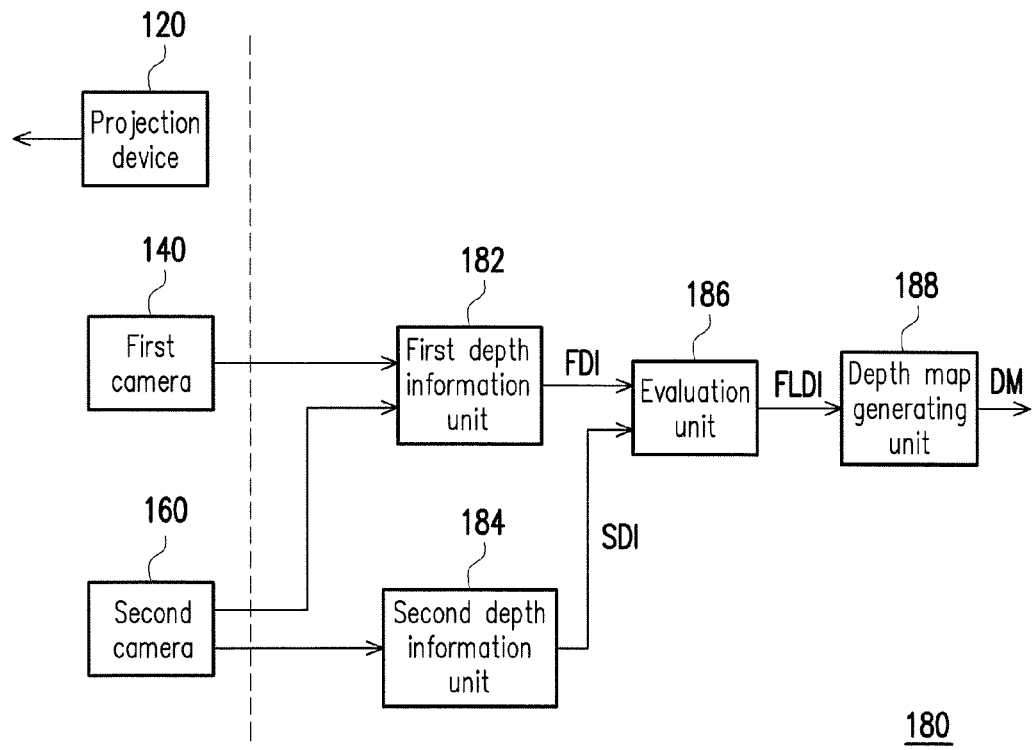
FIG. 3 is a schematic block diagram illustrating a processing device according to an embodiment of the invention.

FIG. 3 is a schematic block diagram illustrating a processing device according to an embodiment of the invention. Referring to FIG. 3, in the embodiment of the invention, the processing device 180 further includes a first depth information unit 182, a second depth information unit 184, an evaluation unit 186 and a depth map generating unit 188, thereby generating a depth map DM of the aforementioned scene according to the first image and the second image generated by the first camera 140 and the second camera 160.

More specifically, in the embodiment, the processing device 180 uses the first depth information unit 182 and the second depth information unit 184, so as to obtain the first depth information and the second depth information from the first image and the second image. Referring to FIG. 1, FIG. 2, and FIG. 3, after the processing device 180 receives the first image and the second image from the first camera 140 and the second camera 160, the first depth information unit 182 compares a visible light image of the first image with a visible light image of the second image to obtain first depth information FDI (Step S162). On the other hand, the second depth information unit 184 identifies an invisible light image of the second image to obtain second depth information SDI (Step S164). After obtaining the first depth information FDI and the second depth information SDI, the processing device 180 further generates the depth map DM of the aforementioned scene.

In an embodiment of the invention, using the visible light images captured from different viewing angles, the first depth information unit 182 calculates the first depth information DFI related to the aforementioned scene. In other words, the first depth information unit 182 uses parallax between the visible light images to calculate depth information of the aforementioned scene. Specifically, the processing device 180 or the first depth information unit 182 obtains the visible light images from the first image and the second image first, and then compares a plurality of image features between the visible light image of the first image and the visible light image of the second image to obtain a plurality of depth values of the aforementioned scene as the first depth information FDI.

In an embodiment of the invention, the second depth information unit 184 uses the patterned invisible light image shot by the second camera 160 to obtain the second depth information SDI. Specifically, the projection device 120 projects the patterned invisible light according to one preset pattern, while the second camera 160 catches the invisible light pattern reflected by the aforementioned scene. Thus, after the processing device 180 obtains the invisible light image signals from the second image shot by the second camera, the second depth information unit 184 further analyzes the invisible light pattern in the invisible light image based on the preset pattern, and determines a plurality of depth distances of the aforementioned scene according to twisting, skew, scaling, and displacement, etc. of the invisible light pattern, thereby obtaining the second depth information SDI.

Figure 4:
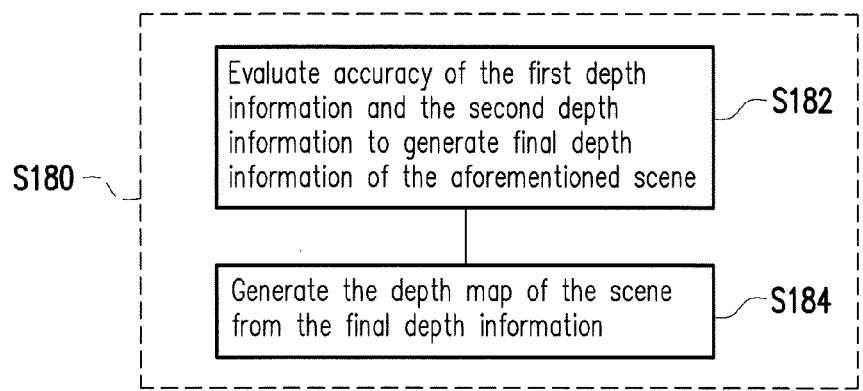
FIG. 4 is a flow chart illustrating a method of generating a depth map from first depth information and second depth information according to an embodiment of the invention.

FIG. 4 is a flow chart illustrating a method of generating a depth map from first depth information and second depth information according to an embodiment of the invention. Referring to FIG. 3 and FIG. 4, in the embodiment, after obtaining the first depth information FDI and the second depth information SDI, the evaluation unit 186 evaluates accuracy of the first depth information FDI and the second depth information SDI to generate final depth information FLDI of the aforementioned scene (Step S182).

Finally, the depth map generating unit 188 generates the depth map DM of the aforementioned scene from the final depth information FLDI (Step S184).

The evaluation unit 186 evaluates the first depth information FDI and the second depth information SDI to decide the appropriate final depth information FLDI. In an embodiment of the invention, the evaluation unit 186 evaluates accuracy of depth values included in the first depth information FDI and depth values included in the second depth information SDI. When the depth values of the first depth information FDI and the second depth information SDI at the relative position or the relative pixel are matched with each other, the aforementioned depth values are kept. On the contrary, when the depth values of the first depth information FDI and the second depth information SDI at the relative position or the relative pixel are not matched with each other, the evaluation unit 186 selects one of the depth values of the first depth information FDI and the second depth information SDI at the relative position or the relative pixel to fill, or calculates according to the depth values of the first depth information FDI and the second depth information SDI at the relative position or the relative pixel to obtain a new depth value, so as to fill the aforementioned relative position or the relative pixel.

In other words, in the aforementioned embodiment, the evaluation unit 186 keeps a portion of depth information of the first depth information FDI and the second depth information SDI which are matched with each other, and fills another portion of depth information of the first depth information FDI and the second depth information SDI which are not matched with each other, thereby generating the final depth information FLDI of the aforementioned scene. It should be noted that, the way to decide the final depth information FLDI is not limited thereto.

In another embodiment of the invention, the evaluation unit 186 selects at least one of the first depth information FDI and the second depth information SDI to obtain the final depth information FLDI of the aforementioned scene according to an environmental condition of the aforementioned scene.

Specifically, based on the first depth information FDI obtained from the visible light image and based on the second depth information SDI obtained from the invisible light image, it has different application conditions with different environmental conditions of the aforementioned scene. Particularly, when the aforementioned scene is located outdoor or the aforementioned scene is too far away from the first camera 140 and the second camera 160, the patterned invisible light image shot by the second camera 160 is easily blurred, such that the second depth information SDI is less accurate. Relatively speaking, for the scene without obvious image features or the whiter scene, it is easier to generate an error when the first depth information FDI is obtained in the way of parallax. Thus, the evaluation unit 186 needs to clarify the environmental condition of the aforementioned scene, so as to preferably evaluate the first depth information FDI and the second depth information SDI to generate the final depth information FLDI of the aforementioned scene.

Figure 5A:
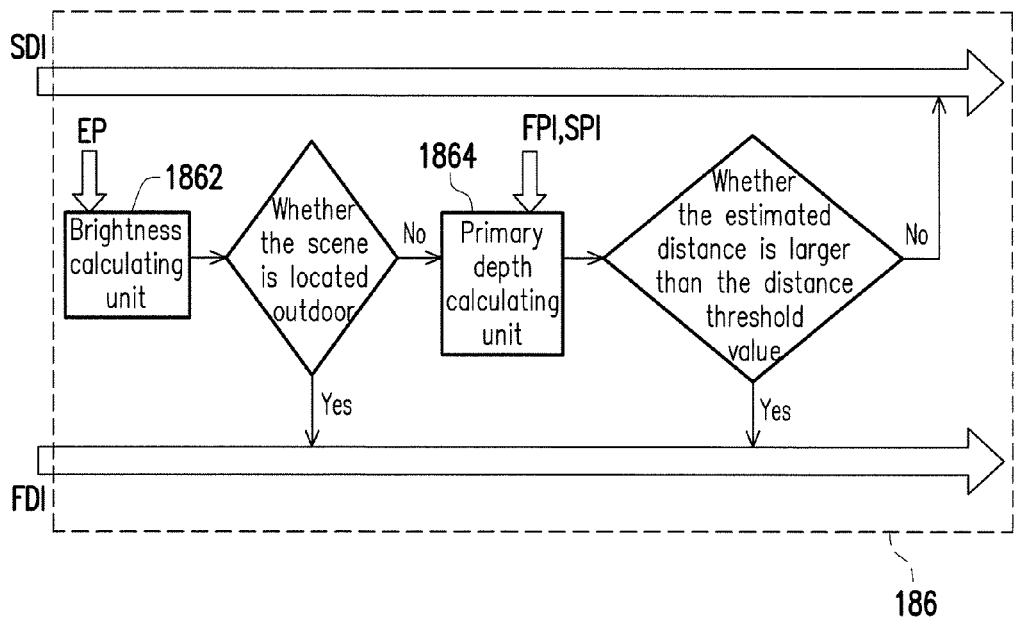
FIG. 5A is a schematic diagram illustrating an evaluation unit according to an embodiment of the invention.

FIG. 5A is a schematic diagram illustrating an evaluation unit according to an embodiment of the invention. Referring to FIG. 5A, the evaluation unit 186 includes a brightness calculating unit 1862 and a primary depth calculating unit 1864. In the embodiment, before generating the final depth information FLDI, the brightness calculating unit 1862 calculates environmental brightness of the aforementioned scene first. In an embodiment of the invention, the brightness calculating unit 1862 obtains exposure parameters EP such as an exposure time, aperture size and photosensitivity from an exposure system (not shown) inside the electronic apparatus 100. Then, the environmental brightness of the aforementioned scene is calculated based on the exposure parameters EP. However, the invention is not limited thereto.

Based on the environmental brightness obtained from the brightness calculating unit 1862, the evaluation unit 186 determines whether the aforementioned scene is located outdoor or not. If the aforementioned scene is located outdoor, in the embodiment, the evaluation unit 186 takes the first depth information FDI as the final depth information FLDI of the aforementioned scene. In an embodiment of the invention, if the brightness calculating unit 1862 determines that the aforementioned scene is located outdoor based on the environmental brightness, the processing device 180 closes the projection device 120 to stop projecting the patterned invisible light. Particularly, when in the outdoor, the patterned invisible light image shot by the second camera 160 may be vaguer or unclear. Thus, the evaluation unit 186 selects the first depth information FDI as the final depth information FLDI of the aforementioned scene, and the processing device 180 closes the projection device 120 to lower power consumption.

Relatively speaking, if the aforementioned scene is not located outdoor, the primary depth calculating unit 1864 further calculates an estimated distance between the aforementioned scene and the first camera 140 and the second camera 160 from a first previous image captured from the aforementioned scene before the first image by the first camera 140 and a second previous image captured from the aforementioned scene before the second image by the second camera 160. The evaluation unit 186 determines whether the estimated distance is larger than a distance threshold value or not.

In the embodiment, before the first camera 140 captures the first image, it further captures visible light information to generate a first previous image FPI of the aforementioned scene. On the other hand, before the second camera 160 captures the second image, it further captures visible light information and invisible light information to generate a second previous image SPI of the aforementioned scene. In other words, the get time of the first previous image FPI and the second previous image SPI is earlier than that of the first image and the second image. In an embodiment, the primary depth calculating unit 1864 calculates the estimated distance between the aforementioned scene and the first camera 140, and the second camera 160 from visible light images of the first previous image FPI and the second previous image SPI. However, the invention is not limited thereto. In another embodiment, the primary depth calculating unit 1864 calculates the estimated distance between the aforementioned scene and the first camera 140, and the second camera 160 from an invisible light image of the second previous image SPI.

To reduce the time of calculating the estimated distance, the first previous image FPI and the second previous image SPI may be scaled-down images. On the other hand, the primary depth calculating unit 1864 may further perform edge detection on the first previous image FPI and the second previous image SPI, and then estimates only on the edge portion to calculate the estimated distance between the aforementioned scene and the first camera 140 and the second camera 160, thereby reducing the time of calculating the estimated distance.

It should be noted that, in an embodiment of the invention, the setting positions of the first camera 140 and the second camera 160 are not consistent, and the estimated distance may be an estimated value obtained after considering the setting position difference. However, the invention is not limited thereto. The primary depth calculating unit 1864 may further calculate the estimated distance between the aforementioned scene and the first camera 140 or the estimated distance between the aforementioned scene and the second camera 160 directly.

Referring to FIG. 5A, in the embodiment, if the evaluation unit 186 determines that the estimated distance is larger than the distance threshold value, it means that the distance between the aforementioned scene and the first camera 140 and the second camera 160 is farer. At this time, the evaluation unit 186 selects the first depth information FDI as the final depth information FLDI of the aforementioned scene. However, if the evaluation unit 186 determines that the estimated distance is not larger than the distance threshold value, the evaluation unit 186 at least generates the final depth information FLDI of the aforementioned scene based on the second depth information SDI.

In an embodiment of the invention, the primary depth calculating unit 1864 may further decide whether to generate the final depth information FLDI of the aforementioned scene based on the second depth information SDI or not according to integrity of the invisible light image of the second previous image SPI (amount of the invisible light image). Specifically, when the integrity of the invisible light image is lower, it means that the distance between the aforementioned scene and the first camera 140 and the second camera 160 is farer. Thus, it is less suitable to generate the final depth information FLDI of the aforementioned scene based on the second depth information SDI.

Figure 5B:
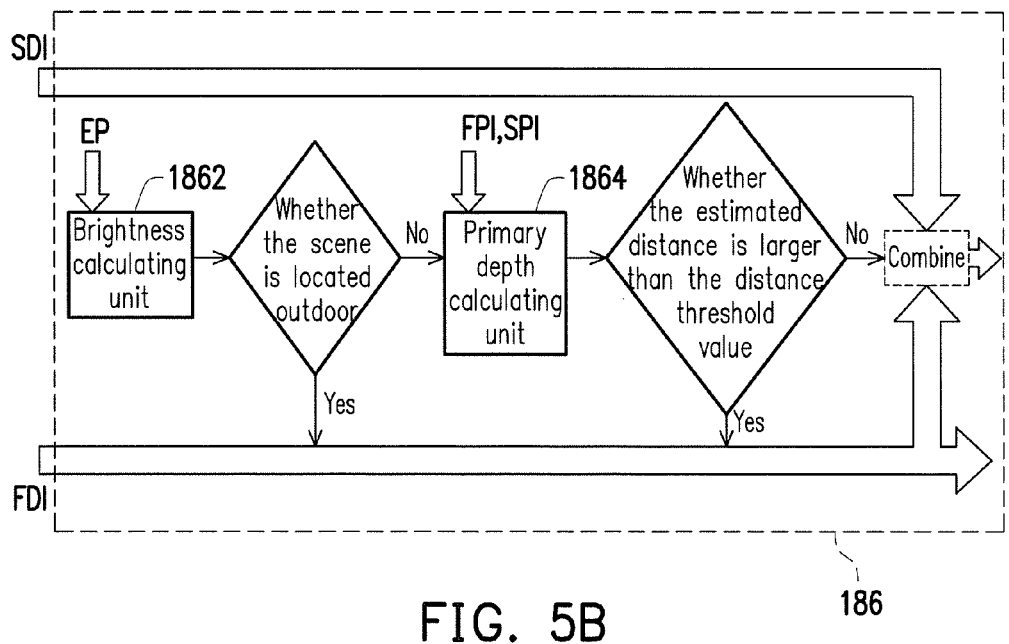
FIG. 5B is a schematic diagram illustrating an evaluation unit according to another embodiment of the invention.

In the embodiment of the invention, if the evaluation unit 186 determines that the estimated distance is not larger than the distance threshold value, the evaluation unit 186 takes the second depth information SDI as the final depth information FLDI of the aforementioned scene directly. However, the invention is not limited thereto. FIG. 5B is a schematic diagram illustrating an evaluation unit according to an embodiment of the invention. Referring to FIG. 5B, in the embodiment, if the evaluation unit 186 determines that the estimated distance is not larger than the distance threshold value, the evaluation unit 186 combines the first depth information FDI and the second depth information SDI to generate the final depth information FLDI of the aforementioned scene. In the embodiment, the evaluation unit 186 keeps a portion of depth information of the first depth information FDI and the second depth information SDI which are matched with each other, and fills another portion of depth information of the first depth information FDI and the second depth information SDI which are not matched with each other, thereby generating the final depth information FLDI of the aforementioned scene. The methods of keeping and filling the depth information are referred to the aforementioned embodiments, and are not repeated here.

The depth map generating unit 188 generates the depth map DM of the aforementioned scene from the final depth information FLDI, and outputs the depth map DM. The depth map DM of the aforementioned scene is used to generate a three-dimensional image of the aforementioned, for example. On the other hand, the depth map DM of the aforementioned scene may be stored in the memory device.

Figure 6:
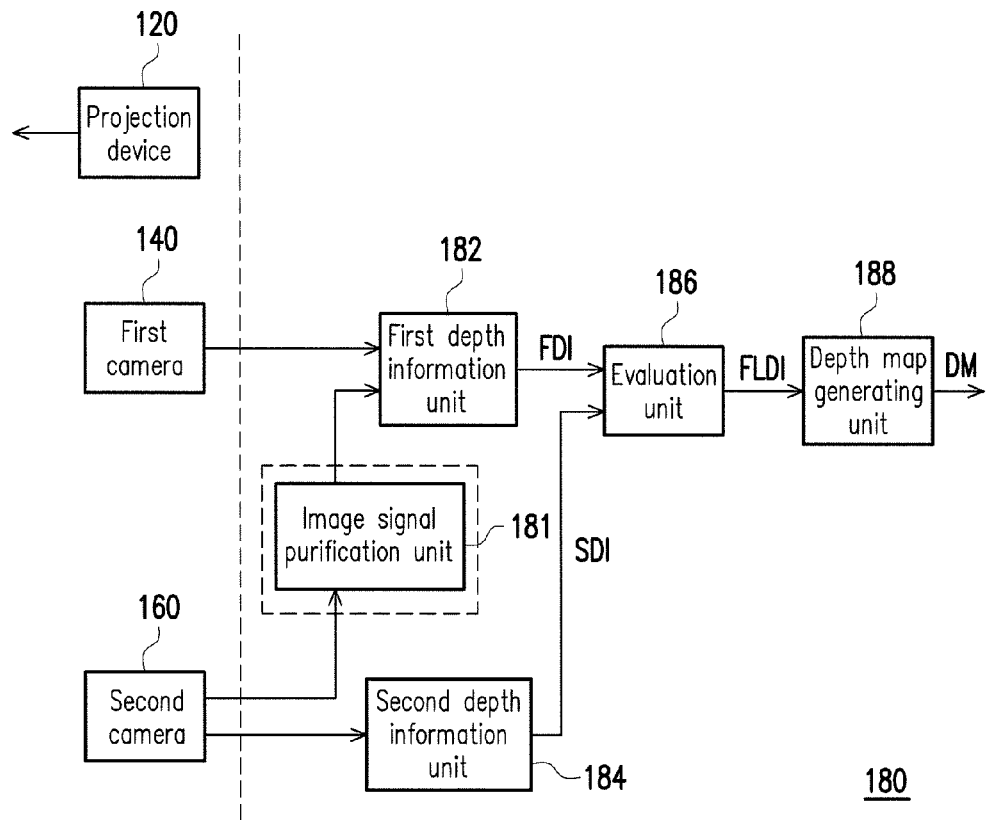
FIG. 6 is a schematic block diagram illustrating a processing device according to another embodiment of the invention.

FIG. 6 is a schematic block diagram illustrating a processing device according to another embodiment of the invention. Referring to FIG. 6, in comparison with the processing device 180 as shown in FIG. 3, in the embodiment, the processing device 180 further includes an image signal purification unit 181. After the image signal purification unit 181 obtains the visible light image in the second image, an invisible light signal in the second image is separated and the visible light image is remained first. Then, the visible light image in the second image with the invisible light information being filtered out is transmitted to the first depth information unit 182. Particularly, the second camera 160 may obtain the image composed of the invisible light information and the visible light information simultaneously. To avoid the visible light image affected by the interference of invisible light noise, in the embodiment, the processing device 180 further includes the image signal purification unit 181, which preferentially separates the invisible light noise in the second image and remains the visible light image. Other elements and operation condition of the processing device 180 are referred to aforementioned FIG. 3, FIG. 4, FIG. 5A, FIG. 5B and related embodiments, and are not repeated here.

Figure 7A:
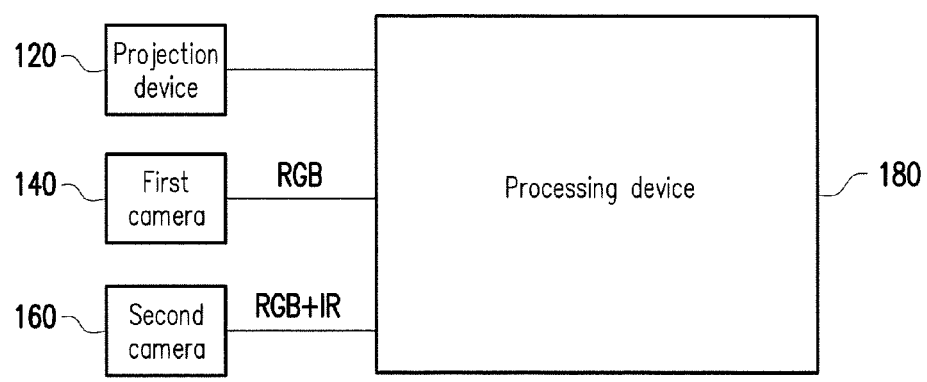
FIG. 7A, FIG. 7B, and FIG. 7C are schematic operation diagrams illustrating an electronic apparatus according to an embodiment of the invention respectively.
Figure 7B:
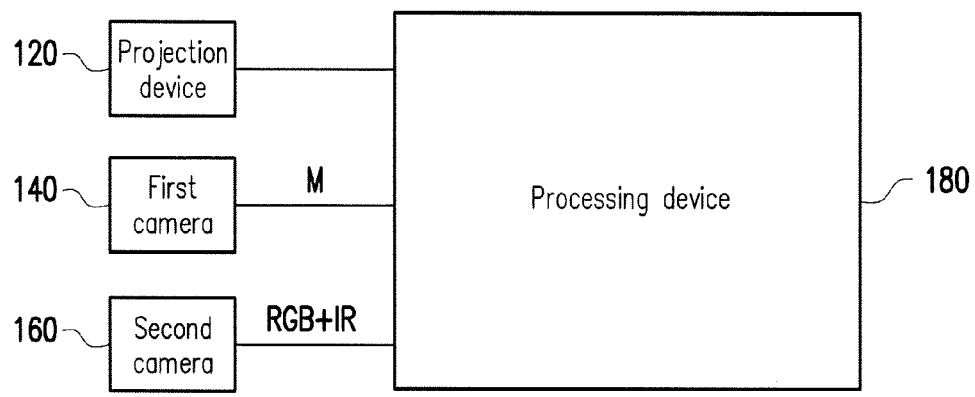
Figure 7C:
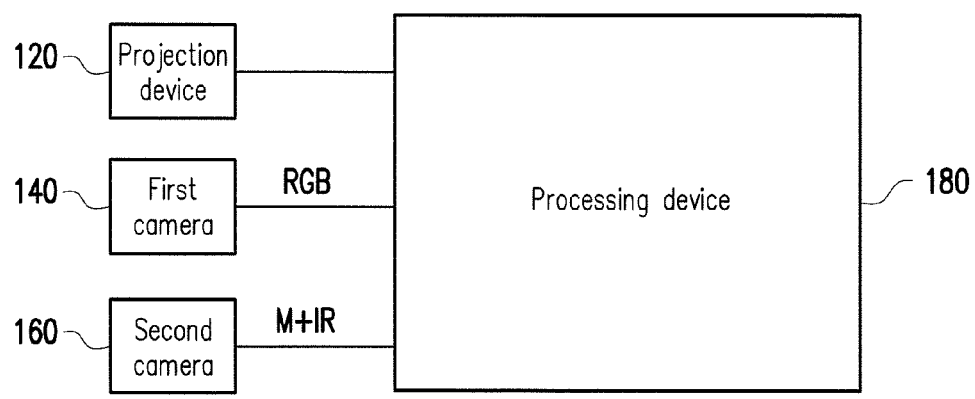

FIG. 7A, FIG. 7B, and FIG. 7C are schematic operation diagrams illustrating an electronic apparatus according to an embodiment of the invention respectively. Referring to FIG. 7A, in the embodiment, the projection device 120 of the electronic device 100 mainly projects patterned infrared light on one scene. Relatively, the first camera 140 captures RGB light information to generate the first image of the aforementioned scene, and the second camera 160 captures RGB light information and infrared light information to generate the second image of the aforementioned scene. In other words, the visible light images in the first image and the second image are RGB images RGB. On the other hand, the invisible light image in the second image is infrared light image IR.

However, it should be noted that, the visible light image and the invisible light image used to generate the depth map are not limited thereto. Referring to FIG. 7B, in another embodiment of the invention, the first camera 140 captures light intensity information to generate the first image of the aforementioned scene, and the second camera 160 captures RGB light information and infrared light information to generate the second image of the aforementioned scene. In other words, in the embodiment, the visible light image in the first image is a gray scale image M.

Similarly, referring to FIG. 7C, in another embodiment of the invention, the first camera 140 captures RGB light information to generate the first image of the aforementioned scene, and the second camera 160 captures light intensity information and infrared light information to generate the second image of the aforementioned scene. In the embodiment, the visible light image in the second image is the gray scale image M.

From the former embodiments, the visible light image and the invisible light image are not limited to the aforementioned image format, but can be correspondingly adjusted based on each image format and used for the aforementioned electronic apparatus 100.

Figure 8:
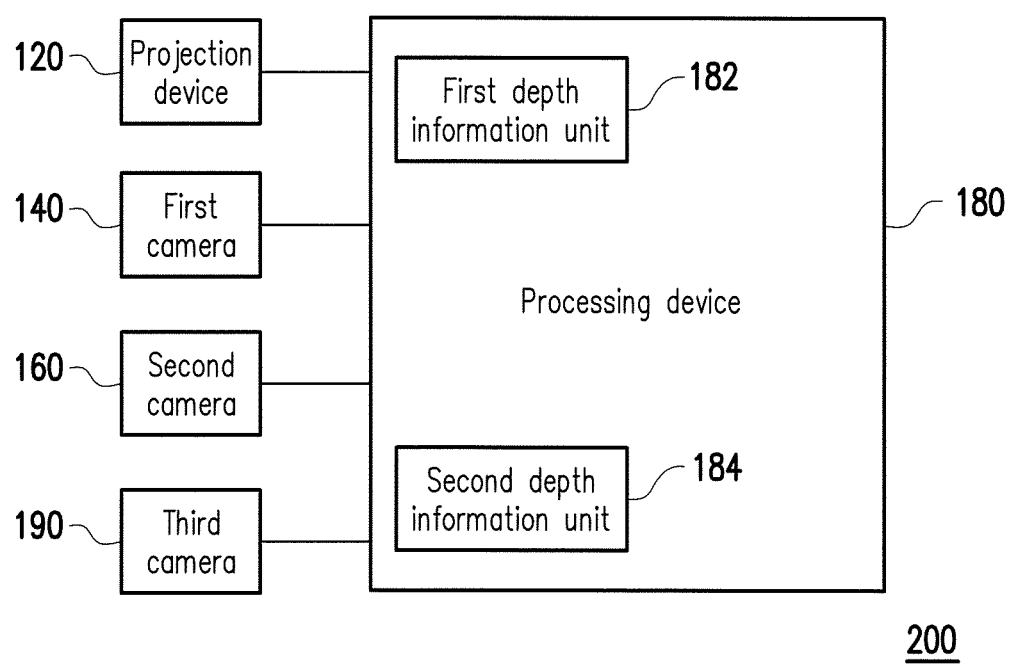
FIG. 8 is a schematic diagram illustrating an electronic apparatus according to an embodiment of the invention.

FIG. 8 is a schematic diagram illustrating an electronic apparatus according to an embodiment of the invention. Referring to FIG. 8, in comparison with the electronic apparatus 100, an electronic apparatus 200 of generating a depth map further includes a third camera 190. In the embodiment, the first camera 140 and the second camera 160 capture RGB light information to respectively generate the first image and the second image of the aforementioned scene. On the other hand, the third camera 190 captures infrared light information to generate a third image of the aforementioned scene. The first camera 140, the second camera 160, and the third camera 190 are a combination of an RGB camera, an RGB camera and an infrared light camera (IR camera), for example. However, the invention is not limited thereto.

In the embodiment, the processing device 180 does not need to perform the identification and separation of the visible light image and the invisible light image on the first image, the second image and the third image. The first depth information unit 182 compares the first image with the second image directly to generate the first depth information, and the second depth information unit 184 identifies the third image to generate the second depth information. On the other hand, when the evaluation unit of the processing device 180 generates the final depth information of the aforementioned scene, it can use the first camera 140, the second camera 160 and the third camera 180 to respectively capture the first previous image, the second previous image and the third previous image of the aforementioned scene generated from the visible light information and the invisible light information, and further calculates the estimated distance between the aforementioned scene and the first camera 140, the second camera 160 and the third camera 180. It should be noted that, the get time of the first previous image, the second previous image and the third previous image is earlier than that of the first image, the second image and the third image.

Apart from the operation difference caused from the setting of the third camera 190, other element structure of the electronic apparatus 200 and the detailed operation process of generating the depth map are referred to the aforementioned related art of the electronic apparatus 100, and are not repeated here.

In summary, in the electronic apparatus and the method of generating the depth map provided by the embodiments of the invention, the patterned invisible light is projected on the shooting scene first. Then, a pair of the first camera and the second camera is used to obtain the first image and the second image of the shooting scene respectively. The first depth information and the second depth information are obtained respectively through the visible light images and the invisible light image in the first image and the second image, and then the depth map of the aforementioned shooting scene is generated according to the first depth information and the second depth information. As the result, the error generated from single depth information affected by the influence of external environmental factors or different shooting scene can be avoided, which may further affect accuracy of the depth map of the aforementioned scene. On the other hand, the number and the setting format of the camera can be adjusted correspondingly, which are not limited to the pair of the first camera and the second camera.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electronic apparatus of generating a depth map, comprising:
    a projection device, projecting patterned invisible light on a scene;
    a first camera, capturing visible light information to generate a first image of the scene;
    a second camera, capturing visible light information and invisible light information to generate a second image of the scene; and
    a processing device, coupled to the projection device, the first camera and the second camera to receive the first image and the second image, the processing device obtaining first depth information and second depth information from the first image and the second image, and generating a depth map of the scene from the first depth information and the second depth information selectively, wherein the processing device comprises:
        a first depth information unit, comparing a visible light image of the first image with a visible light image of the second image to obtain the first depth information;
        a second depth information unit, identifying an invisible light image in the second image to obtain the second depth information;
        an evaluation unit, evaluating accuracy of the first depth information and the second depth information to generate final depth information of the scene; and
        a depth map generating unit, generating the depth map of the scene from the final depth information.

2. The electronic apparatus according to claim 1, wherein the processing device further comprises:
    an image signal purification unit, obtaining the visible light image in the second image, filtering out an invisible light signal in the second image, and transmitting the visible light image in the second image with the invisible light signal being filtered out to the first depth information unit.

3. The electronic apparatus according to claim 1, wherein the evaluation unit evaluates accuracy of a depth value included in the first depth information and a depth value included in the second depth information, keeps a portion of depth information of the two which are matched with each other, performs filling on another portion of depth information of the first depth information and the second depth information which are not matched with each other, and thereby generates the final depth information of the scene.

4. The electronic apparatus according to claim 1, wherein the evaluation unit selects at least one of the first depth information and the second depth information to obtain the final depth information of the scene according to an environmental condition of the scene.

5. The electronic apparatus according to claim 1, wherein the evaluation unit further comprises:

a brightness calculating unit, calculating an environmental brightness corresponding to the scene, and determining whether the scene is located outdoor or not based on the environmental brightness, if it is determined that the scene is located outdoor based on the environmental brightness, the evaluation unit takes the first depth information as the final depth information of the scene.

6. The electronic apparatus according to claim 5, wherein if the brightness calculating unit determines that the scene is located outdoor based on the environmental brightness, the processing device close the projection device to stop projecting the patterned invisible light.

7. The electronic apparatus according to claim 5, wherein the evaluation unit further comprises:
a primary depth calculating unit, if it is determined that the scene is not located outdoor based on the environmental brightness, the primary depth calculating unit calculates an estimated distance between the scene and the first camera and the second camera from a first previous image captured from the scene before the first image by the first camera and a second previous image captured from the scene before the second image by the second camera, and determines whether the estimated distance is larger than a distance threshold value, if it is determined that the estimated distance is larger than the distance threshold value, the evaluation unit takes the first depth information as the final depth information of the scene, and if it is determined that the estimated distance is not larger than the distance threshold value, the evaluation unit generates the final depth information of the scene at least based on the second depth information.

8. The electronic apparatus according to claim 7, wherein if it is determined that the estimated distance is not larger than the distance threshold value, the evaluation unit only takes the second depth information as the final depth information of the scene.

9. The electronic apparatus according to claim 7, wherein if it is determined that the estimated distance is not larger than the distance threshold value, the evaluation unit evaluates accuracy of a depth value included in the first depth information and a depth value included in the second depth information, keeps a portion of depth information of the two which are matched with each other, performs filling on another portion of depth information of the first depth information and the second depth information which are not matched with each other, and thereby generates the final depth information of the scene.

10. The electronic apparatus according to claim 7, wherein the primary depth calculating unit calculates the estimated distance between the scene and the first camera and the second camera from visible light images of the first previous image and the second previous image or an invisible light image of the second previous image.

11. The electronic apparatus according to claim 1, wherein a combination of the first camera and the second camera comprises a combination of a red-green-blue camera (RGB camera) and a red-green-blue infrared light camera (RGB-IR camera), a combination of an RGB camera and a monochromatic light-infrared light camera (MONO-IR camera), and a combination of a monochromatic light camera (MONO camera) and an RGB-IR camera.

12. A method of generating a depth map, adapted to for an electronic apparatus with a first camera and a second camera, comprising:
projecting patterned invisible light on a scene;
capturing a first image of the scene, the first image comprising visible light information;
capturing a second image of the scene, the second image comprising visible light information and invisible light information, wherein the invisible light information comprises image signals generated from reflecting the patterned invisible light by the scene;
obtaining first depth information and second depth information from the first image and the second image, wherein the step of obtaining the first depth information and the second depth information further comprises:
comparing a visible light image of the first image with a visible light image of the second image to obtain the first depth information; and
identifying an invisible light image in the second image to obtain the second depth information;
evaluating accuracy of the first depth information and the second depth information to generate final depth information of the scene; and
generating a depth map of the scene from the final depth information.

13. An electronic apparatus of generating a depth map, comprising:
a projection device, projecting patterned infrared light on a scene;
a first camera, capturing red-green-blue (RGB) light information to generate a first image of the scene;
a second camera, capturing RGB light information and infrared light information to generate a second image of the scene; and
a processing device, coupled to the projection device, the first camera and the second camera to receive the first image and the second image, the processing device obtaining first depth information and second depth information from the first image and the second image, and generating a depth map of the scene from the first depth information and the second depth information selectively, wherein the processing device comprises:
a first depth information unit, comparing an RGB image of the first image with an RGB image of the second image to obtain the first depth information;
a second depth information unit, identifying an infrared light image in the second image to obtain the second depth information;
an evaluation unit, evaluating accuracy of the first depth information and the second depth information to generate final depth information of the scene; and
a depth map generating unit, generating the depth map of the scene from the final depth information.

14. An electronic apparatus of generating a depth map, comprising:
a projection device, projecting patterned infrared light on a scene;
a first camera, capturing RGB light information to generate a first image of the scene;
a second camera, capturing RGB light information to generate a second image of the scene;
a third camera, capturing infrared light information to generate a third image of the scene; and
a processing device, coupled to the projection device, the first camera, the second camera and the third camera to receive the first image, the second image, and the third image, the processing device obtaining first depth information and second depth information from the first image, the second image and the third image, and generating a depth map of the scene from the first depth information and the second depth information selectively, wherein the processing device comprises:
a first depth information unit, comparing the first image with the second image to obtain the first depth information;
a second depth information unit, identifying the third image to obtain the second depth information;
an evaluation unit, evaluating accuracy of the first depth information and the second depth information to generate final depth information of the scene; and
a depth map generating unit, generating the depth map of the scene from the final depth information.

15. The electronic apparatus according to claim 14, wherein the evaluation unit evaluates accuracy of a depth value included in the first depth information and a depth value included in the second depth information, keeps a portion of depth information of the two which are matched with each other, and performs filling on another portion of depth information of the first depth information and the second depth information which are not matched with each other, and thereby generates the final depth information of the scene.

16. The electronic apparatus according to claim 14, wherein the evaluation unit further comprises:
a brightness calculating unit, calculating an environmental brightness corresponding to the scene, and determining whether the scene is located outdoor based on the environmental brightness, if it is determined that the scene is located outdoor based on the environmental brightness, the evaluation unit takes the first depth information as the final depth information of the scene.

17. The electronic apparatus according to claim 16, wherein the evaluation unit further comprises:
a primary depth calculating unit, if it is determined that the scene is not located outdoor based on the environmental brightness, the primary depth calculating unit calculates an estimated distance between the scene and the first camera, the second camera and the third camera from a first previous image captured from the scene before the first image by the first camera, a second previous image captured from the scene before the second image by the second camera, and a third previous image captured from the scene before the third image by the third camera, and determines whether the estimated distance is larger than a distance threshold value, if it is determined that the estimated distance is larger than the distance threshold value, the evaluation unit takes the first depth information as the final depth information of the scene, and if it is determined that the estimated distance is not larger than the distance threshold value, the evaluation unit generates the final depth information of the scene at least based on the second depth information,
wherein the primary depth calculating unit calculates the estimated distance between the scene and the first camera, the second camera and the third camera from the first previous image and the second previous image or the third previous image.

18. The electronic apparatus according to claim 17, wherein if it is determined that the estimated distance is not larger than the distance threshold value, the evaluation unit only takes the second depth information as the final depth information of the scene, or the evaluation unit evaluates accuracy of a depth value included in the first depth information and a depth value included in the second depth information, keeps a portion of depth information of the two which are matched with each other, performs filling on another portion of depth information of the first depth information and the second depth information which are not matched with each other, and thereby generates the final depth information of the scene.

* * * * *